Dec. 31, 1968    E. F. FINKIN    3,418,914
AUTOMOBILE VENTILATION TECHNIQUES
Filed Jan. 20, 1967
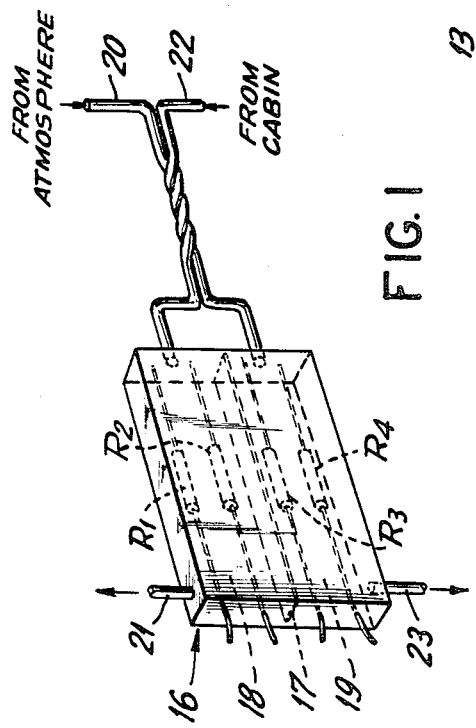
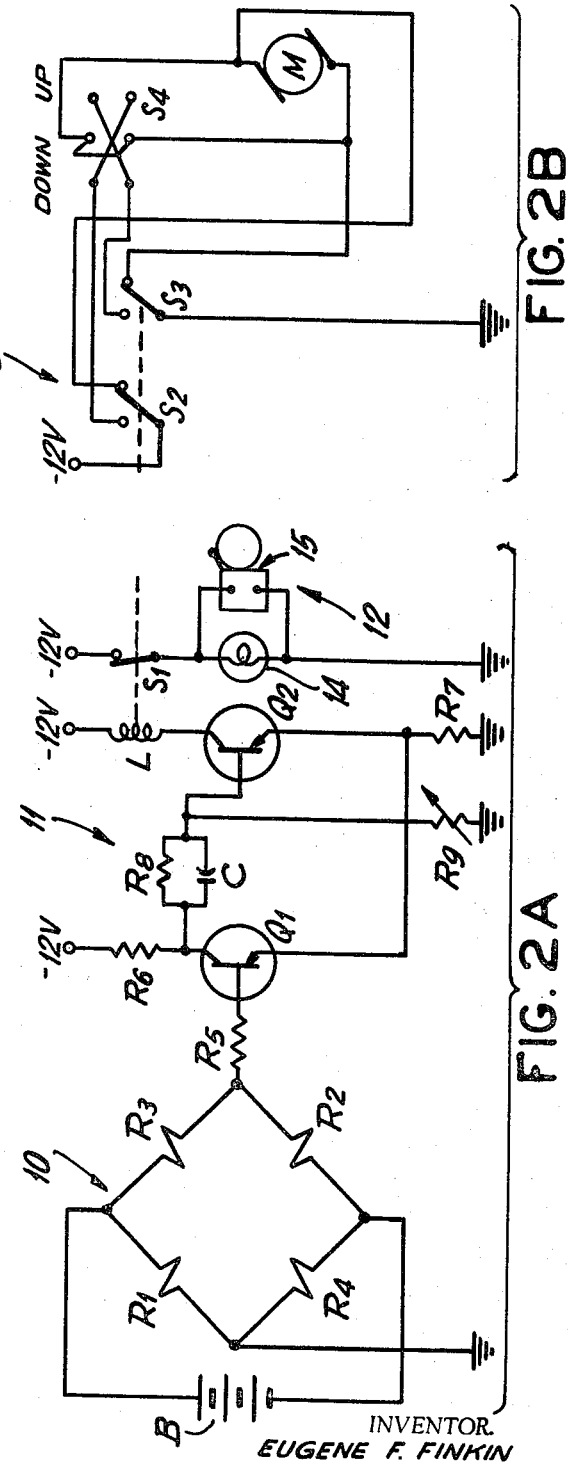
INVENTOR.
EUGENE F. FINKIN
BY
Morgan, Finnegan, Durham & Pine
ATTORNEYS.

United States Patent Office 3,418,914
Patented Dec. 31, 1968

3,418,914
AUTOMOBILE VENTILATION TECHNIQUES
Eugene F. Finkin, 817 2nd St., Apt. 106,
Santa Monica, Calif. 90403
Filed Jan. 20, 1967, Ser. No. 610,564
8 Claims. (Cl. 98—2)

ABSTRACT OF THE DISCLOSURE

A temperature responsive impedance bridge for comparing the thermal conductivity of the cabin atmosphere with that of a reference environment in order to monitor the cabin for abnormal carbon dioxide concentrations is coupled to suitable warning and ventilating apparatus via a relay controlling trigger amplifier network. The threshold voltage of the trigger network is preselected to coincide wtih the output voltage of the bridge circuit occurring when the carbon dioxide condition desired to be detected is present, 7:1 being a useful and satisfactory carbon dioxide ratio for actuation.

---

This invention relates to techniques for assuring proper ventilation of the cabin of an automobile, and more particularly to methods and apparatus for alerting the car's occupants of the presence of carbon monoxide and/or the absence of a sufficient concentration of oxygen and for automatically ventilating the cabin when these conditions are present.

Background of the invention

Many of the automobile accidents which occur each year can be traced to the drivers of the cars and the fact that they did not have sufficient command of their faculties at a time when alertness was required. It is likely that many of these accidents would have been avoided if the cabins of the automobiles had been properly ventilated. Although the cabin of an automobile is not free from leaks and exposure to the outside atmosphere, at least one window of the automobile should be partially open while the vehicle is in motion. Unfortunately, many people tend to drive with their windows closed, particularly in the wintertime. Where the car is filled with passengers, the oxygen supply can be diminished thus subjecting the driver of the automobile to a dangerous slumber-inducing condition.

Another dangerous consequence of improper ventilation is the possible build-up of carbon monoxide in the cabin interior. This should not occur but often does when there is a leak in the exhaust system of the car. This condition also prevails for the most part during the winter months, particularly where the driver allows his car to stand in an idling condition in order to warm up the motor before use. The windows are usually closed and dangerous carbon monoxide fumes can fill the cabin without possibility of detection by the occupants. This build-up of carbon monoxide, if not checked, could lead to death through toxic poisoning, and in any event, dulls the senses of the driver and impairs his judgment.

By providing a system for alerting the occupants of an automobile of the presence of these improper ventilating conditions, either alone or in combination, many lives will be saved. It is a principal object of the present invention to provide such a system.

In providing such a system, a problem exists with respect to the technique which is to be employed for detecting the presence of carbon monoxide.

The techniques employed in gas chromatography cannot be used to detect the presence of carbon monoxide, since the concentration of carbon monoxide sufficient to produce a dangerous condition is quite small and since the thermal properties of this gas are virtually the same as those of air. The prior are discloses a technique for detecting carbon monxide, but this technique requires the use of a chemical reactant in combination with a photoelectric cell, and the expense involved makes it impracticable for use in automobiles.

It is another object of the present invention, therefore, to provide a technique for detecting the presence of carbon monoxide in the cabin of an automobile which is foolproof in application and yet relatively inexpensive. The problem of detection also extends to the oxygen concentration in the automobile cabin and it is yet another object of the present invention to solve this problem.

It is a further object of the present invention to provide a system of the type characterized which will automatically provide additional cabin ventilation when required.

Summary of the invention

The foregoing and other objects are achieved in accordance with the present invention by monitoring the cabin atmosphere for abnormal concentrations of carbon dioxide which are indicative of either the presence of carbon monoxide or the absence of a fresh air supply sufficient to replenish the oxygen being consumed by the car occupants, by alerting the car occupants accordingly, and preferably, by providing additional ventilation when the need therefor is indicated.

In a preferred embodiment, the cabin atmosphere is monitored by a temperature responsive impedance bridge which compares the carbon dioxide concentration in the cabin atmosphere with that of an atmospheric reference environment. The output signal from the bridge is used to activate a warning and/or ventilating system.

Brief description of the drawings

Having summarized the invention, a more detailed discussion follows in which reference is made to the accompanying drawings forming a part of the specification for the purpose of illustrating a typical embodiment of the invention, wherein:

FIGURE 1 is a diagrammatical representation in perspective of apparatus which can be employed for providing atmospheric reference control in accordance with the invention;

FIGURE 2A is a schematic representation of a system in accordance with the present invention for alerting the car occupants of the need for additional cabin ventilation; and FIGURE 2B is a schematic representation of a ventilation system which can be employed in conjunction with the system of FIGURE 2A for carrying out the present invention.

Detailed discussion of the invention

As indicated above, it is a principal object of the present invention to prevent the build-up within an automobile cabin of dangerous concentrations of carbon monoxide which can occur as a result of leaks in the exhaust system of the car. Carbon monoxide is odorless, colorless and tasteless and hence, would not be detected by the occupants of the vehicle. Moreover, carbon monoxide is not readily detectable directly by any known instrumentation which is practicable for use in automobiles.

It has been found, however, that a quantitative relationship exists between carbon monoxide and carbon dioxide in the exhaust of an automobile. This relationship can be expressed in equation form as follows:

$$CO = 20 - 1.39(CO_2) \text{ [by volume]} \qquad (1)$$

where CO represents the concentration of carbon monoxide and $CO_2$ represents the carbon dioxide concentration. Under normal conditions, the ratio of carbon dioxide to carbon monoxide in the automobile exhaust will be approximately 2:1.

While carbon dioxide is not dangerous in and of itself, by monitoring the cabin interior for abnormal concentrations of carbon dioxide in accordance with the present invention, the presence of carbon monoxide can be readily detected.

Since the normal concentration of carbon dioxide in air is known, a simple comparative analysis can be made between the cabin atmosphere and a reference environment, preferably the outside atmosphere, in order to detect abnormal carbon dioxide concentrations in the cabin.

The foregoing discussion, of course, does not take into account the production of carbon dioxide by the driver and passengers of the car. However, as has already been pointed out, automobiles are often allowed to stand unoccupied in an idling condition during the winter months, and the present invention will insure against the driver of the vehicle being faced with dangerous carbon monoxide concentrations when he enters the vehicle. Moreover, abnormal concentrations of carbon dioxide resulting from normal respiration of the occupants of the vehicle indicate that cabin ventilation is inadequate.

In the cabin of an automobile that is insufficiently ventilated, an inverse relationship will exist between the carbon dioxide concentration and the oxygen concentration. As oxygen is used up, it will be replaced by carbon dioxide. By monitoring the cabin interior for abnormal concentrations of carbon dioxide as aforementioned, one can therefore determine if the fresh air entering the cabin is sufficient to replenish the oxygen being used up by the occupants of the car and control of cabin ventilation can be achieved.

A system is accordance with the present invention includes sensing apparatus for monitoring the cabin atmosphere to detect abnormal concentrations of carbon dioxide; warning apparatus for alerting the occupants of the automobile that the concentration of carbon dioxide is approaching the danger level; trigger apparatus for actuating said warning apparatus when said sensing apparatus detects dangerous abnormalities in the carbon dioxide concentration; and ventilation apparatus for automatically providing additional cabin ventilation when said sensing apparatus so indicates the need therefor.

Turning now in detail to the accompanying drawings, a schematic of a preferred system for carrying out the present invention is illustrated in FIGURES 2A and 2B. As shown therein in conjunction with FIGURE 1, a balanced impedance circuit of the Wheatstone bridge type 10 serves as the carbon dioxide sensing apparatus. The bridge circuit is comprised of resistor elements $R_1$, $R_2$, $R_3$ and $R_4$, each resistor comprising one leg of the bridge.

The input terminals $R_1$-$R_3$ and $R_2$-$R_4$ of the bridge circuit are connected to a power source, illustratively the battery B. The output terminals, $R_1$-$R_4$ and $R_2$-$R_3$, are connected to selectively de-energize a relay coil L via a trigger amplifier network designated generally at 11.

Various arrangements of the resistor elements of the bridge can be used in accordance with the present invention. One such arrangement is shown in FIGURE 1. The legs of the bridge corresponding to $R_1$ and $R_2$ are located in the reference environment while legs $R_3$ and $R_4$ are exposed to the cabin atmosphere which is to be monitored. In this arrangement, all of the resistor elements are what may be termed active. As such, each resistor is a temperature responsive element such as a thermistor or hot wire. As current passes through the resistor elements there is a corresponding temperature rise which effects resistivity. When all of the legs of the bridge are placed within the same environment heat dissipation is uniform and the bridge remains balanced. By placing appropriate legs of the bridge in environments having different thermal characteristics, heat dissipation is non-uniform and a bridge imbalance results.

The thermal conductivity of air, having a normal carbon dioxide concentration of 300 parts per million, is 5.572 in metric units at 0° C., whereas carbon dioxide has a the thermal conductivity of 3.393. Thus, as the carbon dioxide concentration in the cabin increases beyond that for the reference atmosphere, the heat dissipating capability of the cabin atmosphere decreases and thermistors $R_3$ and $R_4$ operate at higher temperatures than thermistors $R_1$ and $R_2$. By selecting a carbon dioxide differential between the cabin atmosphere and the reference atmosphere which would be indicative of a dangerous carbon monoxide and/or oxygen condition in the cabin, one can effectively control cabin ventilation. An example of a useful and satisfactory carbon dioxide differential for practicing the present invention can be expressed by the ratio 7:1, i.e., when the carbon dioxide concentration in the cabin is seven times that of the reference atmosphere. The trigger circuit is adjusted to de-energize relay coil L triggering its associated warning and ventilation systems under these conditions.

In other arrangements, only two of the legs of the bridge need be active. With such an arrangement one active leg is placed in the cabin environment and the other active leg is placed in the reference environment.

The trigger amplifier network 11 has a common emitter circuit and includes two PNP type transistors $Q_1$ and $Q_2$. One output terminal $R_1$-$R_4$ of the bridge circuit is connected to ground and the other output terminal $R_2$-$R_3$ is connected to the base of transistor $Q_1$ via a resistor $R_5$. The collector of transistor $Q_1$ is connected to a negative 12-volt source, preferably the car battery, via resistor $R_6$ whereas the collector of transistor $Q_2$ is connected to the same minus 12 voltage source via relay coil L. The emitters of transistors $Q_1$ and $Q_2$ are connected to ground through a common emitter resistor $R_7$. The collector of transistor $Q_1$ is coupled to the base of transistor $Q_2$ through a coupling network consisting of a resistor $R_9$ in parallel with a capacitor C. The base of transisor $Q_2$ is connected to ground through a variable resistor $R_9$.

In the normal state when a zero or positive potential is applied to the base of transistor $Q_1$, transistor $Q_1$ is nonconductive whereas transistor $Q_2$ is conductive. When the potential at terminal $R_2$-$R_3$ becomes negative thereby driving the base of transistor $Q_1$ negative, transistor $Q_1$ begins to conduct. Because of the common emitter coupling between the transistors, transistor $Q_2$ becomes nonconductive and thereafter transistors $Q_1$ and $Q_2$ are rapidly driven into the fully conductive and cutoff states respectively. In the normal state, when transistor $Q_2$ is fully conductive, current flows through relay coil L and the relay is energized whereas, in response to a negative input signal, transistor $Q_2$ becomes nonconductive and the relay is de-energized.

In the example given above, it is desirable that the relay be de-energized whenever the output potential of the bridge circuit exceeds a value occurring when the carbon dioxide content in the cabin is approximately seven times that in the reference environment. This is accomplished by appropriately adjusting variable resistor $R_9$. It can readily be seen from the foregoing that the trigger circuit can be adjusted to de-energize the relay at any desired carbon dioxide ratio.

Coupled to the trigger circuit via relay coil L are the warning system 12 and the automatic ventilation system 13.

Warning system 12 can include any suitable type and number of warning devices. Illustratively, a lamp 14 is coupled in parallel with a bell 15, the two devices being connected between ground and a negative 12-volt source, which can be the car battery, via a relay contact $S_1$ including a normally closed set of contacts, i.e., relay contact $S_1$ is closed when the relay coil L is de-energized.

The automatic ventilation system preferably includes means for opening the windows of the automobile although various other ventilation means can be foreseen and are contemplated by the invention.

A motor M is provided for opening and closing the car windows and is selectively coupled to the relay via an interconnected arrangement of relay contacts $S_2$ and $S_3$ and a polarity reversing switch $S_4$.

Relay contacts $S_2$ and $S_3$ are of the two position type each including a normally open stationary contact, a normally closed stationary contact and a movable contact. The movable contact of $S_2$ is connected to a minus 12-volt source such as the car battery. The movable contact of $S_3$ is connected to ground.

Relay contacts $S_2$ and $S_3$ and polarity reversing switch $S_4$ are connected to control motor M. The interconnections are so arranged that in the normal state of trigger network 11, the motor is connected to the car battery through the reversing switch, this being achieved by connection through the relay contacts when the relay is in the energized state. Thus, the car windows can be opened and closed in the normal fashion by manually operating switch $S_4$.

When the relay is de-energized in response to abnormal carbon dioxide concentrations switch $S_4$ is bypassed and motor M is connected directly to the car battery via relay contacts $S_2$ and $S_3$ with the proper polarity for causing the motor to open the car windows.

While the system illustrated in the drawings provides for actuation of the warning system and ventilation system simultaneously, it may be desirable, in certain instances, to provide independent actuation of these systems, so that a warning to the car occupants precedes automatic ventilation or vice versa. Modification of the presently illustrated system to accomplish this result should be obvious to one skilled in the art and it is to be understood that such an arrangement is contemplated by the present invention.

FIGURE 1 illustrates, diagrammatically, apparatus for providing atmospheric reference control. As shown therein, a single compact unit can be employed. A housing 16, illustratively of rectangular configuration, is divided by a partition 17 into two separate chambers 18 and 19. Positioned within chamber 18, which is in communication with the outside atmosphere via inlet tube 20 and outlet tube 21, are thermistors $R_1$ and $R_2$. Thermistors $R_3$ and $R_4$ are located within chamber 19 which is exposed to the cabin atmosphere via tubes 22 and 23. Suitable fans or other circulation equipment (not shown) can be employed.

Inlet tubes 20 and 22 are formed with relatively thin walls and are placed in intimate heat conductive relation with respect to one another, as by twisting as shown, so that heat transfer will bring the two air streams into thermal equilibrium prior to contacting the active elements of the bridge. Suitable means (now shown) can be employed for closing off reference inlet tube 20 from the outside atmosphere when the vehicle is passing through a tunnel or is sitting in an enclosed structure such as a garage, in order to prevent false indications due to possible distortions in the reference environment.

The system operates in the following manner to assure proper cabin ventilation. Battery B sends small amounts of current through the four legs of the bridge. This current flow causes the active elements of the bridge to heat effecting their resistivity. At the same time, samples of the cabin atmosphere are continuously being sent into cabin chamber 19 via inlet tube 22 and outlet tube 23 while thermistor elements $R_1$ and $R_2$ are being exposed to the reference environment as explained above. When the cabin is adequately ventilated so that the atmospheric reference environment and the cabin atmosphere are virtually identical, uniform heat dissipation will occur with respect to all of the active elements of the bridge and the bridge will remain balanced for all practical purposes. Slight imbalances may occur, but the output voltage of the bridge in such instances will be insufficient to cause de-energization of the relay.

If cabin ventilation is inadequate, the cabin atmosphere will take on abnormal characteristics. These abnormalities, when due to exhaust system leaks, inadequate oxygen due to occupant consumption, or a combination of both, are accompanied by a build-up of carbon dioxide in the cabin. As the carbon dioxide builds up in the cabin, heat dissipation from $R_3$ and $R_4$ decreases and the output voltage of the bridge concurrently increases, the heat dissipation from $R_1$ and $R_2$ remaining constant. When the output voltage of the bridge coincides with the threshold voltage of the trigger network, the relay is de-energized the movable contacts of $S_1$, $S_2$, and $S_3$ move to the positions shown in the drawings and the warning system alerts the occupants of the vehicle of the danger. At the same time, the car windows are opened by the motor M. The relay remains de-energized until the output voltage of the bridge circuit falls below the threshold voltage of the trigger circuit. While the relay is de-energized, the driver has no control over the windows of the car since the polarity reversing switch $S_4$ has been taken out of the circuit. When the relay is energized, the movable contacts of $S_1$, $S_2$ and $S_3$ move to the alternate positions from those shown in the drawings, the warning system is disconnected, and the driver again has manual control of the windows via switch $S_4$.

The invention in its broader aspects is not limited to the specific mechanisms shown and described but departures may be made therefrom within the scope of the accompanying claims without departing from the principles of the invention and without sacrificing its chief advantages.

What is claimed is:

1. A system for assuring proper ventilation of the cabin of an automobile comprising:
    (a) carbon dioxide detection means including a relay and a trigger means for controlling the energization of said relay in accordance with concentrations of carbon dioxide with said cabin and a temperature responsive impedance circuit for comparing the carbon dioxide concentration in said cabin with that in atmospheric reference environment and
    (b) warning means responsive to said relay of said detection means for alerting the automobile occupants when said detection means indicates the existence of a predetermined carbon dioxide concentration in the cabin interior.

2. A system as defined in claim 1 wherein said impedance circuit is of the Wheatstone bridge type.

3. A system for assuring proper ventilation of the cabin of an automobile comprising:
    (a) carbon dioxide detection means for monitoring the atmosphere of said cabin to detect abnormal concentrations of carbon dioxide and
    (b) ventilation means including means for automatically opening the windows of said automobile cabin for automatically providing additional cabin ventilation when said detection means indicates the need therefor.

4. A system for assuring proper ventilation of the cabin of an automobile comprising:
    (a) carbon dioxide sensing means including a temperature responsive impedance circuit for comparing the thermal conductivity of the cabin atmosphere with that of the reference atmosphere, for comparing the carbon dioxide concentration in the cabin atmosphere with that in an atmospheric reference environment.
    (b) a warning system for alerting the automobile occupants when a pre-determined carbon dioxide differential exists between said cabin atmosphere and said reference atmosphere.
    (c) trigger means for actuating said warning system in accordance with the output signal of said sensing means and
    (d) ventilation means for automatically providing said cabin with additional ventilation when said sensing means indicates the need therefor.

5. A system as defined in claim 4 wherein said impedance circuit is a Wheatstone bridge arrangement of thermistors.

6. A method for preventing the build-up of carbon monoxide and assuring an adequate oxygen concentration in the cabin of an automobile comprising the steps of:
   (a) monitoring the cabin atmosphere for abnormal concentrations of carbon dioxide by comparing the carbon dioxide concentration in said cabin with that in an atmospheric reference environment and
   (b) alerting the automobile occupants when the carbon dioxide concentration reaches a pre-determined magnitude indicative of a dangerous carbon monoxide and/or oxygen condition within the cabin.

7. A method in accordance with claim 6 wherein the thermal conductivity of the cabin atmosphere is compared with that of said reference atmosphere.

8. A method in accordance with claim 6 wherein the automobile occupants are alerted when the carbon dioxide concentration in said cabin is approximately seven times that in said reference atmosphere.

References Cited

UNITED STATES PATENTS

| | | | |
|---|---|---|---|
| 1,602,092 | 10/1926 | Witz | 340—237 |
| 2,373,112 | 4/1945 | Francis | 340—237 |
| 2,781,506 | 2/1957 | Harrison | 340—237 |
| 2,879,663 | 3/1959 | Thomas | 340—237 |

MEYER PERLIN, *Primary Examiner.*

U.S. Cl. X.R.

340—237; 73—27